United States Patent Office 3,065,028
Patented Nov. 20, 1962

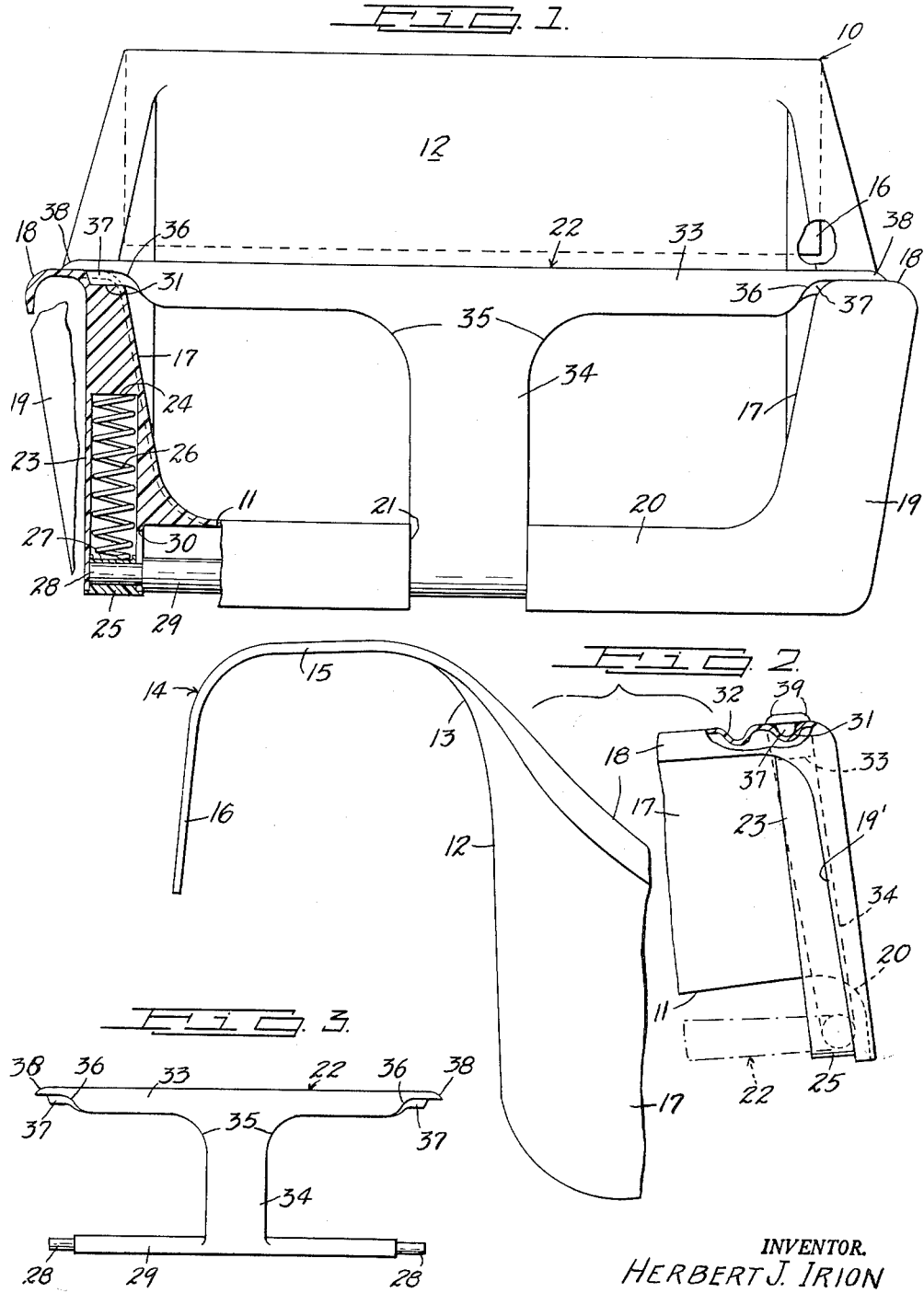

3,065,028
PORTABLE INFANT'S SEAT HAVING YIELDABLE
SWINGING RETAINING FRAME
Herbert J. Irion, 58 Helen St., Fanwood, N.J.
Filed July 13, 1961, Ser. No. 123,755
9 Claims. (Cl. 297—390)

This invention relates to seats for use by infants, particularly seats of this type and kind fashioned for mounting in conjunction with the back of an automobile seat. More particularly, the invention deals with a seat of the character described employing at the front portion thereof a generally H-shaped retaining frame tensionally supported in operative position in retaining an infant from accidental displacement from the seat.

Still more particularly, the invention deals with a seat structure of the character described, wherein said frame is adjusted into different positions in the seat in support of different size infants therein.

The novel features of the invention will be best understood from the following description, when taken together with the accompanying drawing, in which certain embodiments of the invention are disclosed and, in which, the separate parts are designated by suitable reference characters in each of the views and, in which:

FIG. 1 is a front view of a seat made according to my invention, with parts of the construction broken away and in w-section.

FIG. 2 is a bracketed side view of the seat shown in FIG. 1 illustrating the front and rear portions thereof, with part of the construction broken away and in section and indicating, in dot-dash lines, part of the supporting frame in collapsed inoperative position; and FIG. 3 is a detached detail view of the H-frame employed on a reduced scale.

In illustrating one adaptation and use of my invention, I have illustrated in FIGS. 1 and 2 of the drawing a seat 10 of molded plastic material. The seat bottom is indicated at 11 and extending integrally with the seat bottom is an upwardly directed back 12 terminating at its upper end in a rearwardly extending rounded portion 13 joining what might be termed a hook-shaped supporting member 14, comprising a top wall 15 and a downwardly inclined and slightly flared vertical wall 16. The hook 14 is adapted to be mounted upon the upper portion of the back of a car seat in support of the infant's seat upon the front surface of the car seat, as with other devices of this type and kind. It will be noted, from a consideration of FIG. 1 of the drawing, that the wall 16 extends the major portion of the width of the back wall 12 of the seat and this wall may be cutout or apertured to reduce the overall weight of the seat. By providing the great width in the wall 16, a strong and sturdy support of the seat upon the back of the car seat will be provided.

Extending integrally from sides of the seat bottom 11 and also integrally with the back wall 12 are seat sides 17, upper portions of which include outwardly and downwardly extending armrest portions 18, as clearly indicated at the left of FIG. 1 of the drawing, wherein part of the seat is broken away in illustrating part of the structure in section.

The armrest portions 18 also extend integrally with laterally extending fronts 19 integral with the sides 17 and also integrally with a depending rounded front wall portion 20 at the front of the seat bottom 11. The front wall portion 20, including part of the seat bottom 11 centrally of the front of the seat, is cutaway or apertured, as seen at 21 in FIG. 1 of the drawing, for free swinging movement of a generally H-shaped retaining frame 22.

Formed integrally with the sides 17 and fronts 19 are cylinder portions 23, one of which is shown in detail at the left of FIG. 1 of the drawing, it being understood that both sides of the seat will be of similar construction. The bore of the cylinder portions 23 terminates, as indicated at 24, the bore opening through the lower end of the cylinder portions and this lower end is closed by a cap or plug 25. Arranged in each of the cylinder portions is a spring 26, the lower end of which operates upon a disc 27 arranged above the reduced pivot ends 28 of the lower member 29 of the frame 22. The pivot ends 28 operate in elongated apertures 30 on inner surfaces of the cylinder portions 23, these apertures opening through the lower ends of the cylinder portions to facilitate positioning of the pivot ends 28 in the cylinder portions prior to attachment of the caps or plugs 25, the latter being suitably cemented in position, particularly when the seat is composed of plastic material. The elongated apertures 30 are of sufficient length to provide for adjustment of the H-frame 22 into different positions, as later described.

Inner surfaces of the upper armrest portions 18 of the seat have spaced recesses 31 and 32, note FIG. 2 of the drawing, for support of the frame 22 in different positions on the seat.

For purposes of description, the lower member 29 of the frame 22, on considering the substantial H-formation of the frame, can be referred to as one side of the frame. The opposed side 33 is of greater cross-sectional contour than the member 29 and substantially parallels the member 29, the side 33 forming handgrip portions at the top of the frame when the frame is in operative position, as indicated in FIGS. 1 and 2 of the drawing. The sides 29 and 33 are joined centrally of the frame in a connecting cross-bar or web 34, the web 34 joining the lower surfaces of the side 33 in curved wall portions, as indicated at 35 in FIG. 3 of the drawing.

Outer terminal ends of the side 33 are recessed on the lower surfaces thereof, as indicated at 36, and centrally of the recessed portions is a downwardly extending key lug 37 adapted to operate in either of the recesses 31, 32 of the armrest portions in retaining the frame 22 in different positions at the front of the seat. In this connection, it will be understood that the springs 26 normally urge the frame 22 downwardly to retain the lugs 37 in operative position and this tension is sufficiently strong to prevent an infant from displacing the side or top member 33 of the frame from the recesses 31 or 32 when the frame is in operative position. At the same time, it will be understood that the frame can be forcibly raised and swung downwardly in removing an infant from the seat, the frame being retained in this downward position until an infant is again replaced in the seat, after which the frame can be moved into operative retaining position.

For collapsing or storage, the frame 22 can be collapsed upon the bottom 11 of the seat, as indicated, in part, in dot-dash lines in FIG. 2 of the drawing.

Returning now to the key lugs 37, it will be apparent that these lugs terminate short of the ends 38 of the side or top member 33 of the frame and these ends also extend laterally, as indicated at 39 in FIG. 2 of the drawing, to provide a reasonably large surface engagement of the ends 38 with the armrest portions and to conceal the grooves or key sockets 31 or 32 when the frame is in engagement with either of these sockets.

Aside from the springs 26, the spring seats 27 and the caps or plugs 28, the seat may be said to be composed of two primary parts, namely the seat proper and the molded H-frame 22. In assemblage of the frame with the seat, the springs 26 are first placed in the cylinder portions 23, after which the seats 27 are placed in position; whereupon, the pivot ends 28 of the frame 22 are placed in the cylinder portions through the elongated apertures 30, the spring placed under tension and held under tension until the caps or plugs are secured in position, after which the assemblage is ready for use. Considering the righthand portion of FIG. 1 of the drawing, it will appear that the fronts 19, 20 of the seat completely conceal the cylinder portions 23, producing a neat and finished appearance at the front of the seat and the rounded rearwardly extending sides 19' of the fronts 19 partially conceal the cylinder portions 23, as will appear from a consideration of FIG. 2 of the drawing.

In the swinging movement of the frame 22, the crossbar or web 34 operates in the aperture 21 and this aperture extends onto the seat bottom 11 sufficiently to swing the front 22 into its several locked positions. It will be understood that the generally H-shaped retaining frame is adapted for use in connection with seat structures of any type or kind for retaining the occupant of the seat against accidental displacement and, by virtue of the swinging movement of the frame, the seat becomes accessible for entry and exit when the frame is in lowered position.

Having fully described my invention, what I claim as new and desire to secure by Letters Patent is:

1. A molded seat structure comprising integral bottom, back, side walls and armrest portions at upper ends of the side walls, a generally H-shaped retaining frame comprising parallel side members joined centrally in an integral connecting web, means pivotally supporting ends of one of the side members at the forward lower end portion of the seat for swinging movement of the frame into raised and lowered positions with respect to the seat, the end portions of the other side member of the frame including key means operatively engaging key sockets in the armrest portion of the seat, and tensional means actuating said frame to yieldably support the second named side member of the frame against accidental displacement from the armrest portion.

2. A seat structure as defined in claim 1, wherein the first named means comprise pivot ends on the first named side member of the frame operating in cylinder portions at the forward sides of the seat structure, and said tensional means comprising coil springs arranged in said cylinder portions and operatively engaging said pivot ends.

3. A seat structure as defined in claim 2, wherein said cylinder portions are integral with sides and armrest portions of the seat.

4. A seat structure as defined in claim 2, wherein said cylinder portions are apertured for movement of said pivot ends in movement of the frame into operative and inoperative positions.

5. A seat structure as defined in claim 1, wherein at least two key sockets are in each armrest portion for securing the frame in at least two retained positions on the seat.

6. A seat structure as defined in claim 1, wherein said key means of the second named side member of the frame comprise lugs, and ends of said second named side member of the frame extending beyond ends and sides of said lugs.

7. A seat structure are defined in claim 2, wherein forward portions of the seat bottom and side walls include projecting portions concealing the first named side of said frame and said cylinder portions in viewing the seat structure at the front thereof.

8. The combination with a seat structure comprising bottom, back and side wall members with armrest portions at the upper ends of the side wall members, of a generally H-shaped retaining frame comprising upper and lower substantially parallel members, a web joining said members centrally of the frame, said web being integral with the upper member, said upper member extending between the armrest portions at the front portion of the seat structure, means on the upper member and said armrest portions for keying ends of said upper member with said armrest portions, means pivotally and movably supporting ends of the lower member with the forward end of the seat bottom, and tensional means operatively engaging said last named means for yieldably supporting the upper member of the frame in keyed position in connection with said armrest portions.

9. The combination with a seat structure comprising bottom, back and armrest portions at sides of the seat structure, of a retaining frame comprising an upper member extending between and movable relatively to the armrest portions at the front portion of the seat structure, means on the upper member and said armrest portions for retaining said upper member against accidental displacement from said armrest portions, said upper member including a central integral depending web, the lower end of the web including means pivotally and movably supporting said frame at the forward end of the seat structure to compensate for vertical and pivotal movement of said frame, and tensional means operatively engaging said last named means for yieldably supporting the upper member in retained position on said armrest portions.

References Cited in the file of this patent
UNITED STATES PATENTS

| | | |
|---|---|---|
| 2,481,382 | Bennett | Sept. 6, 1949 |
| 2,585,721 | Bachand | Feb. 12, 1952 |
| 2,664,150 | Byrne | Dec. 29, 1953 |